US012275610B2

(12) United States Patent
Snir et al.

(10) Patent No.: US 12,275,610 B2
(45) Date of Patent: *Apr. 15, 2025

(54) LOADING MECHANISM FOR SHIRTS

(71) Applicant: Kornit Digital Ltd., Rosh HaAyin (IL)

(72) Inventors: Ohad Snir, Kiryat-Ono (IL); Nuriel Amir, Yokneam Ilit (IL); Haggai Abbo, Kiryat Ono (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,637

(22) Filed: Dec. 19, 2023

(65) Prior Publication Data

US 2024/0116726 A1 Apr. 11, 2024

Related U.S. Application Data

(63) Continuation of application No. 17/268,964, filed as application No. PCT/IL2018/051412 on Dec. 30, 2018, now Pat. No. 11,851,300.
(Continued)

(51) Int. Cl.
*B65H 3/20* (2006.01)
*B41F 15/18* (2006.01)
(Continued)

(52) U.S. Cl.
CPC ............... *B65H 3/20* (2013.01); *B41F 15/18* (2013.01); *B41F 19/004* (2013.01);
(Continued)

(58) Field of Classification Search
CPC ...... B65H 3/20; B65H 3/32; B65H 2701/174; B41F 16/02; B41F 17/003
See application file for complete search history.

(56) References Cited

U.S. PATENT DOCUMENTS 3,099,970 A 8/1963 Hite
3,785,638 A 1/1974 Beazley
(Continued)

FOREIGN PATENT DOCUMENTS

CN 1153738 7/1997
CN 201473072 5/2010
(Continued)

OTHER PUBLICATIONS

Communication Pursuant to Article 94(3) EPC Dated Mar. 31, 2023 From the European Patent Office Re. Application No. 18930827.3 (4 Pages).

(Continued)

*Primary Examiner* — Jennifer Bahls
*Assistant Examiner* — Quang X Nguyen

(57) ABSTRACT

Apparatus for picking a garment having a front and a back and placing the garment over a pallet such that the front and the back of the garment are on the front and the back sides respectively of the pallet. The apparatus comprises a picking arm to approach the garment and then withdraw towards the pallet; and one or more adherence locations on the picking arm, the adherence location being smaller than the first side, the adherence location for contacting the garment and causing adherence of the garment at the contact location, thereby causing the picking arm to pull the front of the garment over the front of the pallet, the back of the garment sliding under the first side onto the back of the pallet. Adherence may involve freezing.

8 Claims, 5 Drawing Sheets

Related U.S. Application Data

(60) Provisional application No. 62/719,783, filed on Aug. 20, 2018.

(51) Int. Cl.

| | |
|---|---|
| ***B41F 19/00*** | (2006.01) |
| ***B41J 3/407*** | (2006.01) |
| ***B41J 11/06*** | (2006.01) |

(52) U.S. Cl.

CPC ............ *B41J 3/4078* (2013.01); *B41J 11/06* (2013.01); *B65H 2701/174* (2013.01)

(56) References Cited

U.S. PATENT DOCUMENTS

| | | | | |
|---|---|---|---|---|
| 4,153,240 | A | 5/1979 | Gouley | |
| 4,955,854 | A | 9/1990 | Roth | |
| 4,968,018 | A | 11/1990 | Hoehne et al. | |
| 5,060,924 | A * | 10/1991 | Airaksinen ............ | A41H 43/02 271/18.1 |
| 5,154,119 | A | 10/1992 | Fuqua et al. | |
| 5,174,202 | A | 12/1992 | Schlichting | |
| 5,845,569 | A | 12/1998 | Tkacz et al. | |
| 5,970,874 | A | 10/1999 | Bill | |
| 6,158,343 | A | 12/2000 | Hoffman, Jr. et al. | |
| 6,276,274 | B1 | 8/2001 | Hoffman, Jr. et al. | |
| 8,555,760 | B2 | 10/2013 | Heidlmayer et al. | |
| 11,851,300 | B2 * | 12/2023 | Snir ........................ | B41J 11/06 |
| 2001/0029657 | A1 | 10/2001 | Eppinger | |
| 2004/0187715 | A1 | 9/2004 | Niimi | |
| 2009/0241474 | A1 | 10/2009 | Actis | |
| 2016/0200090 | A1 | 7/2016 | Fuqua | |
| 2019/0299663 | A1 | 10/2019 | Takagiwa | |
| 2021/0309008 | A1 | 10/2021 | Snir et al. | |
| 2021/0309474 | A1 | 10/2021 | Shimoni et al. | |

FOREIGN PATENT DOCUMENTS

| | | |
|---|---|---|
| CN | 201882660 | 6/2011 |
| CN | 104803217 | 7/2015 |
| CN | 105564021 | 5/2016 |
| CN | 106743821 | 5/2017 |
| CN | 206394216 | 8/2017 |
| CN | 207346830 | 5/2018 |
| DE | 4411826 | 8/1995 |
| EP | 2740572 | 6/2014 |
| KR | 10-1693596 | 1/2017 |
| WO | WO 93/13680 | 7/1993 |
| WO | WO 2008/146143 | 12/2008 |
| WO | WO 2020/039421 | 2/2020 |
| WO | WO 2020/039422 | 2/2020 |

OTHER PUBLICATIONS

Decision on Rejection Dated Feb. 27, 2023 From the State Intellectual Property Office of the People's Republic of China Re. Application No. 201880098371.4. (6 Pages).

English Summary and Claims Dated Jun. 30, 2022 of Notification of Office Action and Search Report Dated Jun. 10, 2022 From the State Intellectual Property Office of the People's Republic of China Re. Application No. 201880098371.4. (6 Pages).

English Summary Dated Jul. 8, 2022 of Notification of Office Action and Search Report Dated Jun. 12, 2022 From the State Intellectual Property Office of the People's Republic of China Re. Application No. 201880098381.8. (2 Pages).

English Summary Dated Feb. 24, 2023 of Notification of Office Action Dated Feb. 15, 2023 From the State Intellectual Property Office of the People's Republic of China Re. Application No. 201880098381.8. (4 pages).

Final Official Action Dated Jun. 9, 2022 from Re. U.S. Appl. No. 17/269,269. (16 pages).

Final Official Action Dated Oct. 17, 2022 from Re. U.S. Appl. No. 17/268,964. (25 pages).

International Preliminary Report on Patentability Dated Mar. 4, 2021 From the International Bureau of WIPO Re. Application No. PCT/IL2018/051408. (6 Pages).

International Preliminary Report on Patentability Dated Mar. 4, 2021 From the International Bureau of WIPO Re. Application No. PCT/IL2018/051412. (7 Pages).

International Search Report and the Written Opinion Dated Apr. 15, 2019 From the International Searching Authority Re. Application No. PCT/IL2018/051408. (9 Pages).

International Search Report and the Written Opinion Dated Mar. 25, 2019 From the International Searching Authority Re. Application No. PCT/IL2018/051412. (11 Pages).

Notice of Allowance Dated Jan. 13, 2023 from Re. U.S. Appl. No. 17/269,269. (11 pages).

Notice of Allowance Dated Aug. 21, 2023 from Re. U.S. Appl. No. 17/268,964. (13 pages).

Notification of Office Action Dated Oct. 20, 2022 From the State Intellectual Property Office of the People's Republic of China Re. Application No. 201880098371.4 and Its Summary in English. (7 Pages).

Notification of Office Action and Search Report Dated Jun. 10, 2022 From the State Intellectual Property Office of the People's Republic of China Re. Application No. 201880098371.4. (8 Pages).

Notification of Office Action and Search Report Dated Jun. 12, 2022 From the State Intellectual Property Office of the People's Republic of China Re. Application No. 201880098381.8. (9 Pages).

Notification of Office Action and Search Report Dated Dec. 31, 2021 From the State Intellectual Property Office of the People's Republic of China Re. Application No. 201880098371.4. (7 Pages).

Notification of Office Action Dated Sep. 1, 2023 From the State Intellectual Property Office of the People's Republic of China Re. Application No. 201880098381.8. (4 Pages).

Notification of Office Action Dated Feb. 15, 2023 From the State Intellectual Property Office of the People's Republic of China Re. Application No. 201880098381.8. (9 Pages).

Official Action Dated Sep. 7, 2021 From Re. U.S. Appl. No. 17/269,269. (14 Pages).

Official Action Dated Mar. 21, 2022 from Re. U.S. Appl. No. 17/268,964. (26 pages).

Summary Dated Mar. 15, 2023 of Decision on Rejection Dated Feb. 27, 2023 From the State Intellectual Property Office of the People's Republic of China Re. Application No. 201880098371.4. (2 Pages).

Summary of Notification of Office Action Dated Sep. 1, 2023 From the State Intellectual Property Office of the People's Republic of China Re. Application No. 201880098381.8. (1 Page).

Supplementary European Search Report and the European Search Opinion Dated May 18, 2022 From the European Patent Office Re. Application No. 18930827.3. (9 Pages).

Supplementary European Search Report and the European Search Opinion Dated May 18, 2022 From the European Patent Office Re. Application No. 18930921.4. (8 Pages).

Translation Dated Jan. 28, 2022 of Notification of Office Action Dated Dec. 31, 2021 From the State Intellectual Property Office of the People's Republic of China Re. Application No. 201880098371.4. (3 Pages).

* cited by examiner

LOADING MECHANISM FOR SHIRTS

RELATED APPLICATIONS

This application is a continuation of U.S. patent application Ser. No. 17/268,964 filed on Feb. 17, 2021, which is a National Phase of PCT Patent Application No. PCT/IL2018/051412 having International Filing Date of Dec. 30, 2018, which claims the benefit of priority under USC § 119(e) of U.S. Provisional Patent Application No. 62/719,783 filed on Aug. 20, 2018. The contents of the above applications are all incorporated by reference as if fully set forth herein in their entirety.

FIELD AND BACKGROUND OF THE INVENTION

The present invention, in some embodiments thereof, relates to a loading mechanism and, more particularly, but not exclusively, to a loading mechanism for loading shirts, tee shirts, other garments and textiles in general, for onward processing by printing machines or sewing machines or the like.

Loading paper for printing is well understood and technologies such as vacuum are able to grab and load sheets of paper onto high speed printers and other devices that use paper. However textiles and clothing are more difficult.

First of all the textile is not a solid surface so that vacuum is less able to grip, and indeed with some textile materials is not able to maintain a grip that is strong enough to overcome the weight of the textile.

Textile can be gripped by mechanical grippers, in which fingers or pincers grab upper and lower surfaces of a layer. However textiles for printing often come in the form of ready-formed garments. In such a case the garment is to be fitted around a form-pallet, so that the upper side of the garment is over the pallet and the lower part of the garment is below the pallet. Mechanical grippers are likely however to grab upper and lower sides of the garment together, rather than upper and lower faces of one side, and thus fail to fit the garment correctly over the form pallet.

Another solution is to use static electricity. Static electricity generally lifts only one side of the garment. However static electricity requires a grabbing surface formed by a pad that is larger than the garment to be lifted, otherwise the garment peels off, and the results can vary depending on environmental factors such as humidity levels.

Thus to date there is no reliable solution that can take a garment from the top of a stack or pile of garments and automatically fit the garment over a form pallet, and thus an operator has to manually fit the garment. For a high-speed printer the operator may have to fit a new garment onto the pallet several times a minute, a task that involves bending over and after a while can lead to back problems.

SUMMARY OF THE INVENTION

The present embodiments grab the top outer front of a garment only, by causing adhesion at selected points, and pull the garment onto a pallet so that the front is over the pallet and the back slides under the pallet. An example may use drops of liquid frozen by chilled contact points to cause the adhesion, thus allowing an arm to grab the garment by the outer layer and pull the garment onto a pallet so that the inner layer is not held and slides under the pallet. A flexible pipe provides chiller fluid from a chiller to the contact points so that the contact points are mobile with the loading mechanism.

Such adhesion is intended to be achieved without harming the garment, a problem with the prior art methods, such as mechanical methods that may strain or tear the garment, or methods that use wax and like materials that may stain the garment by leaving residues, which residues may not be removed by the usual printing and curing flow.

According to an aspect of some embodiments of the present invention there is provided apparatus for picking a garment having a first side and a second side and fitting the garment on a pallet having a front and a back such that the first side and the second side of the garment are on the front and the back sides respectively of the pallet, the apparatus comprising:

- a picking arm configured to approach the garment and then withdraw towards the pallet;
- at least one adherence location on the picking arm, the adherence location being smaller than the first side, the adherence location for contacting the garment at a contact location on an outer facing surface of the first side of the garment and causing adherence of the garment, at the contact location, to the adherence location, thereby causing the picking arm to pull the first side over the pallet, wherein the uncontacted second side slides under the first side onto the back side of the pallet.

In an embodiment, the adherence location is a chill point, the chill point when contacting the contact location causing liquid on the garment at the contact location to freeze and thus to adhere to the adherence location.

In an embodiment, the picking arm further comprises at least one liquid outlet for dispensing liquid onto the contact location prior to contact with the adherence location to provide the contact location with liquid for freezing by the chill point.

In an embodiment, the liquid outlet comprises a hollow needle dripper for accurately dispensing the liquid onto the contact location.

In an embodiment, the liquid is water.

In an embodiment, the liquid is water with at least one added ingredient to increase viscosity and/or modify surface tension.

In an embodiment, the added ingredient comprises polyethylene glycol or ethylene glycol.

Embodiments may comprise a chiller for cooling the chill point.

In an embodiment, the chiller is mounted separately from the picking arm and is connected via a flexible pipe to the chill point, the chiller providing coolant to travel down the pipe and to evaporate in the vicinity of the chill point.

In an embodiment, the chill point is kept below zero degrees Celsius or below a freezing point of the liquid.

In an embodiment, the chill point is kept at or below minus 6 degrees Celsius and/or below minus 15 degrees Celsius and/or at or below minus 20 degrees Celsius.

An embodiment may comprise two chill points or three or more than three chill points.

In an embodiment, each chill point is associated with a separate liquid outlet.

Embodiments may use a knife, or other sharp or blunt edge for splitting the garment from the attachment location at the pallet.

Embodiments may use two or three or more attachment points.

The garment may be a top garment in a stack of garments.

According to a second aspect of the present invention there is provided apparatus for picking a garment having a first side and a second side and fitting the garment on a pallet having a front and a back such that the first side and the second side of the garment are on the front and the back sides respectively of the pallet, the apparatus comprising:

- a picking arm configured to approach the garment and then withdraw towards the pallet;
- at least one adherence location on the picking arm, the adherence location for contacting the garment at a contact location on an outer facing surface of the first side of the garment and causing adherence of the garment, at the contact location, to the adherence location, thereby causing the picking arm to pull the first side over the pallet, wherein the uncontacted second side slides under the first side onto the back side of the pallet, the adherence location comprising a chill point to freeze liquid at the contact location, to attach the contact location by freezing.

According to a third aspect of the present invention there is provided apparatus for providing chilling to mobile chill points, the apparatus comprising:

- a chiller unit configured to provide liquid coolant; and
- at least one flexible tube carrying the liquid coolant to the vicinity of the mobile chill points to evaporate the coolant in the vicinity of the chill points, thereby to chill the chill points, the tube having a first end fixed to the chiller unit and a second end in the vicinity of the mobile chill points.

According to a fourth aspect of the present invention there is provided apparatus for picking an item, the item being garment or length of textile, the apparatus comprising:

- a picking arm configured to approach the item and then withdraw;
- at least one adherence location on the picking arm, the adherence location for contacting the item at a contact location on an outer facing surface of the item and causing adherence of the item, at the contact location, to the adherence location, the picking arm thereby enabled to pull the item while withdrawing, the adherence location comprising a chill point to freeze liquid at the contact location, to attach the contact location by freezing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings.

DESCRIPTION OF SPECIFIC EMBODIMENTS OF THE INVENTION

Figure 1:
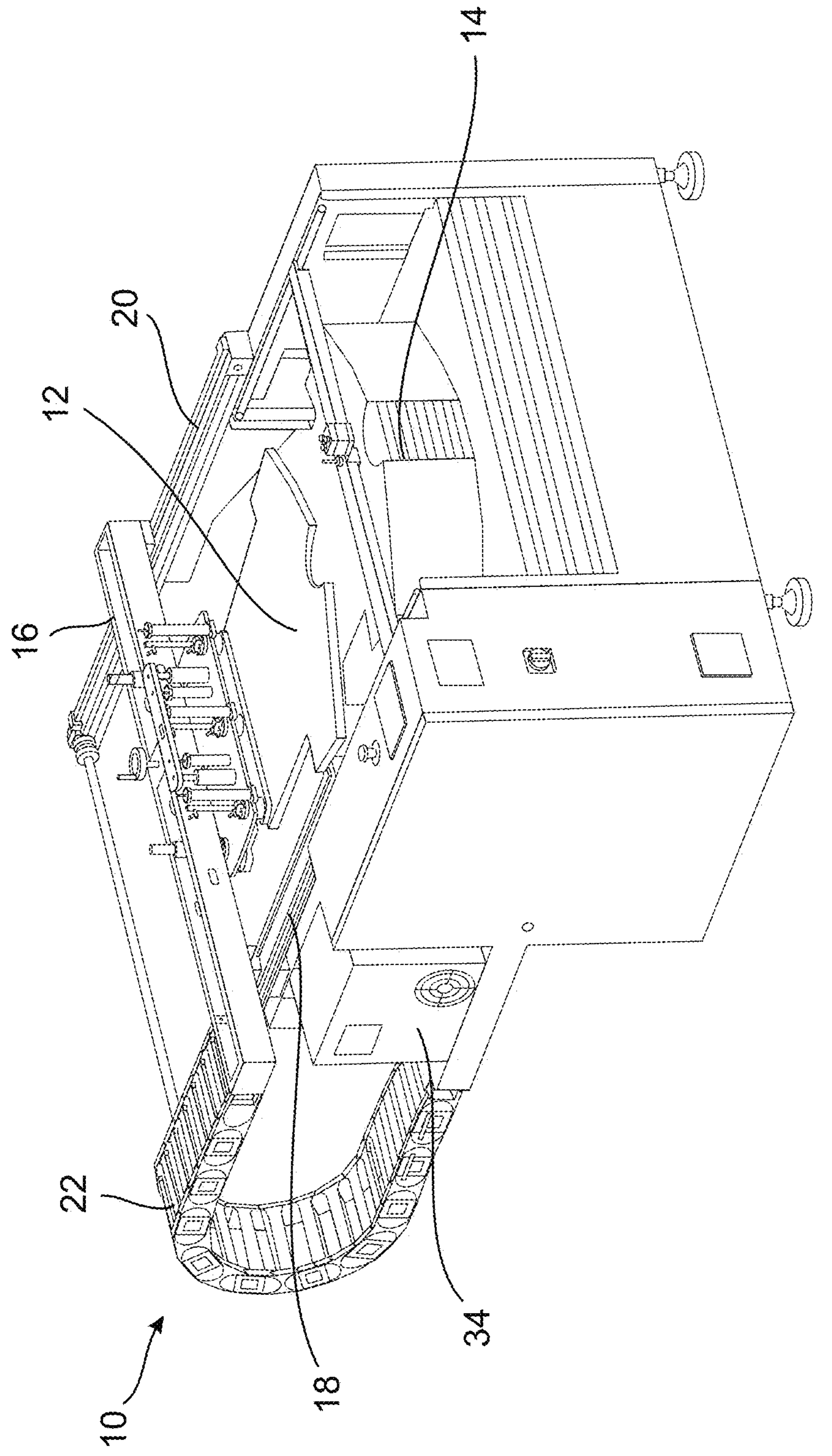
FIG. 1 is a photograph of a simplified apparatus for taking a garment from a pile and placing around a pallet according to an embodiment of the present invention.

As explained above, the present invention, in some embodiments thereof, relates to a loading mechanism and, more particularly, but not exclusively, to a loading mechanism for loading shirts, tee shirts, other garments and textiles in general, for onward processing by printing machines or sewing machines, or textile gluing machines or the like.

The present embodiments relate to an apparatus for picking a garment having a front and a back and placing the garment over a pallet such that the front and the back of the garment are on the front and the back sides respectively of the pallet. The apparatus comprises a picking arm, or robotic arm, to approach the garment and then withdraw towards the pallet; and one or more adherence locations on the picking arm, the adherence location being smaller than the first side, the adherence location for contacting the garment and causing adherence of the garment at the contact location, thereby causing the picking arm to pull the front of the garment over the front of the pallet, the back of the garment sliding under the first side onto the back of the pallet, thereby placing or loading the garment onto the pallet for onward processing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 4:
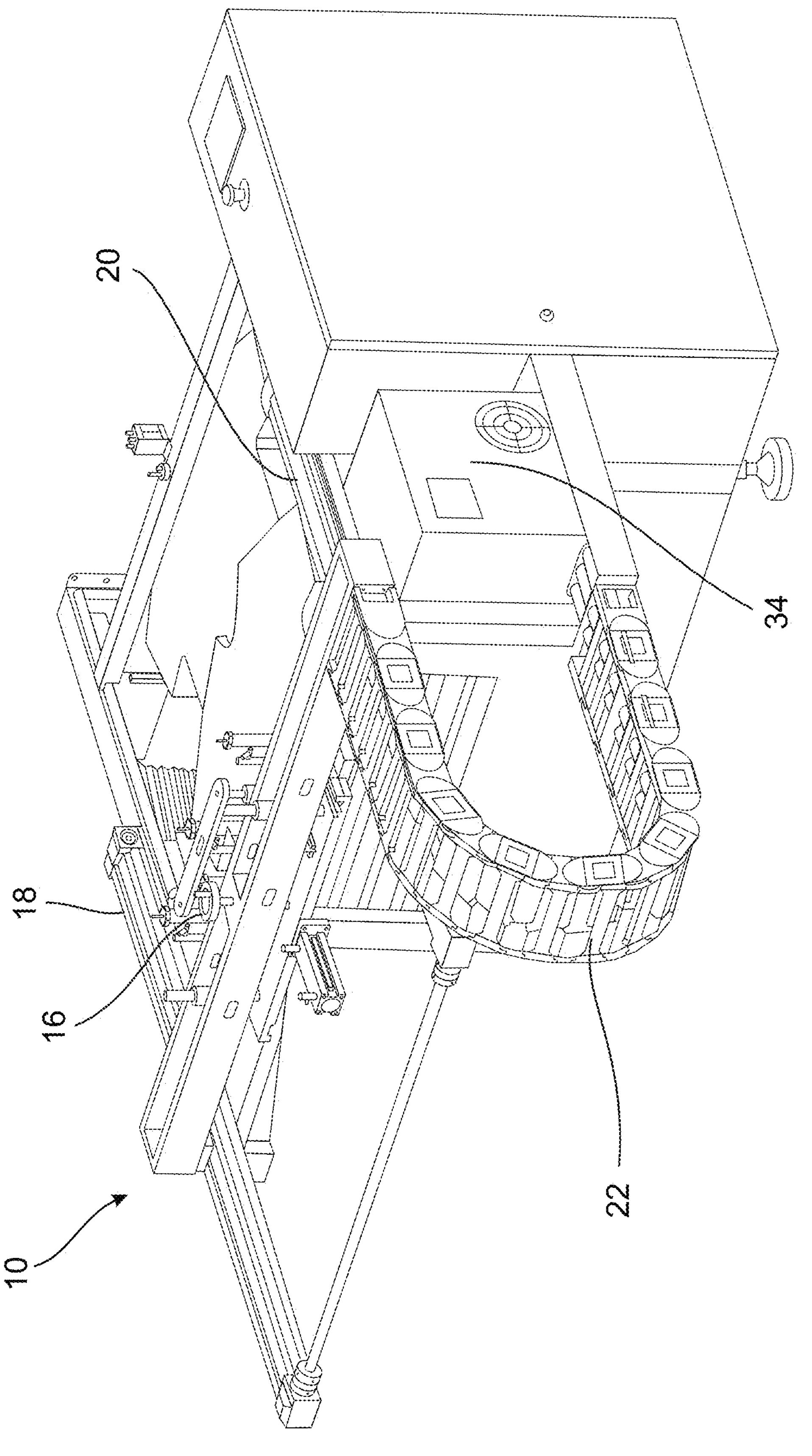
FIG. 4 is a view of the apparatus of FIG. 1 from the opposite direction.
Figure 5:
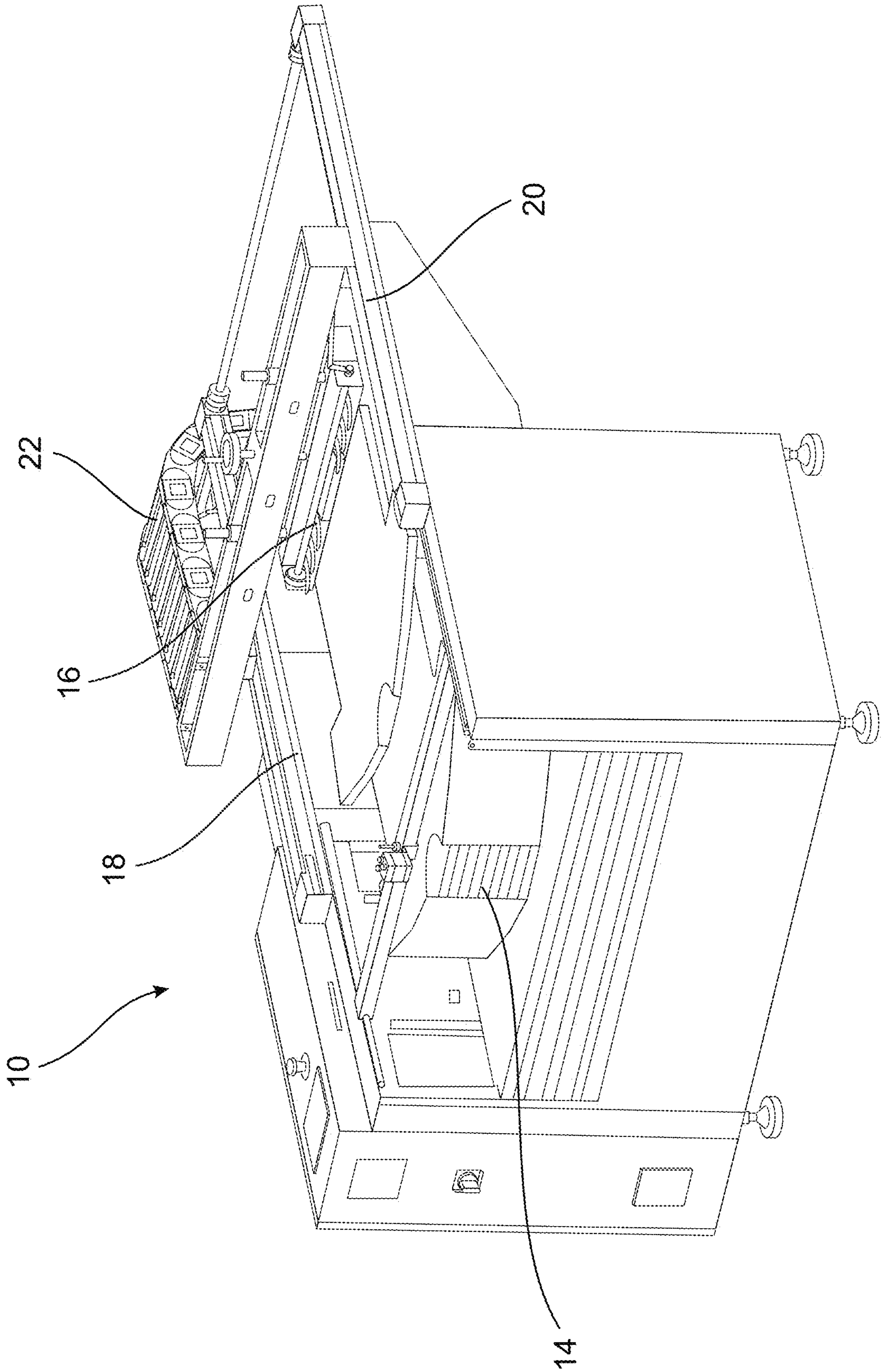
FIG. 5 is a view of the apparatus of FIG. 1 from the side.

Referring now to the drawings, FIGS. 1, 4 and 5, illustrate from three different angles apparatus 10 whose task is to pick up a garment having a first side and a second side, that is a front and a back, for example a shirt or a tee-shirt—here illustrated by blanks 12. The garment may be taken from a pile of garments 14. The garment is grabbed from above at the front of the waste by picking arm 16 and pulled back onto a pallet which likewise has a front and a back. The picking arm may comprise a robot arm. The issue is that the garment is to fit over the pallet, that is the garment is to fit in such a way that the front of the garment is over the front of the pallet and the back of the garment is over the back of the pallet. As mentioned, this may be achieved by grabbing the garment from the front at the waist and pulling the garment over the pallet. The back of the garment then follows the front and slides under the pallet as the front of the garment slides over the top of the pallet. The present embodiments relate to improved ways of grabbing the garment from the front.

Picking arm 16 may travel along rails 18 and 20 to approach the garment and then withdraw towards the pallet.

The picking arm is provided with power, coolant, suction and any other services, as will be discussed in greater detail below, via flexible duct 22.

Figure 3:
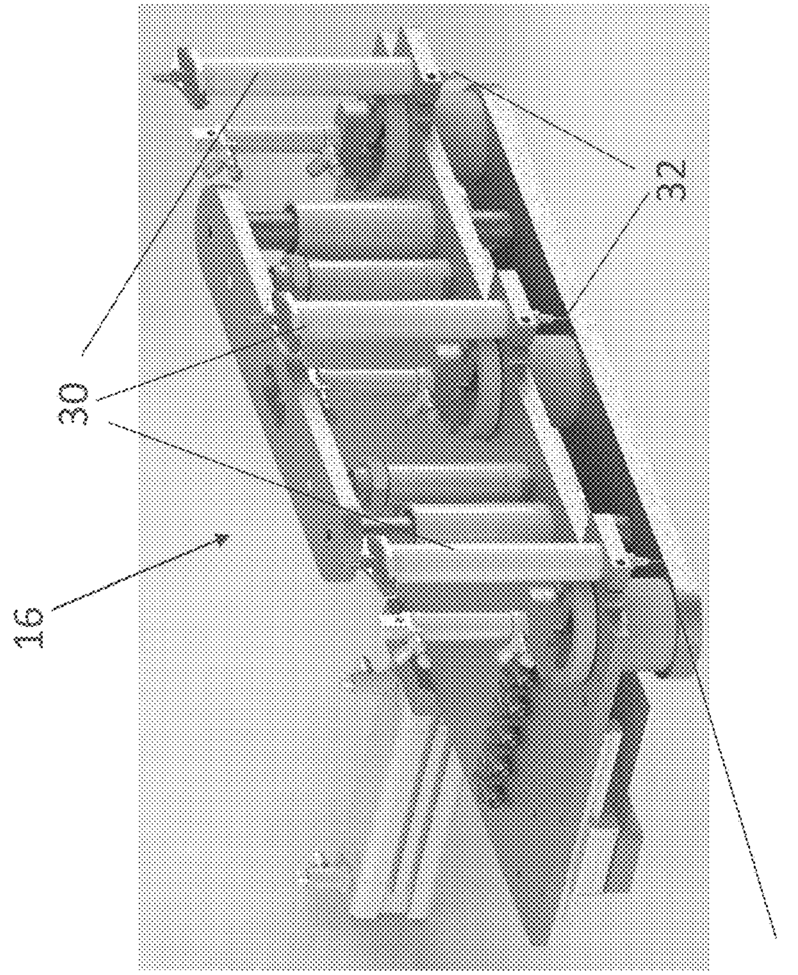
FIG. 3 is a view from the front of the picking arm of FIG. 2.
Figure 2:
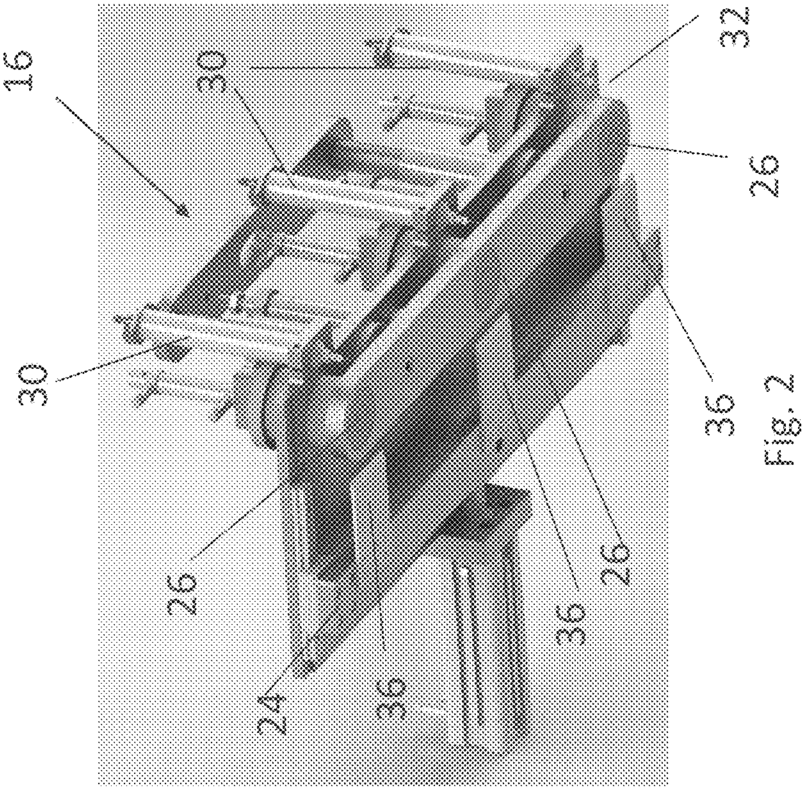
FIG. 2 is a photograph showing a view from below of a picking arm of the embodiment of FIG. 1.

Reference is now made to FIG. 2 which is a view from below of an embodiment of the picking arm 16. FIG. 3 shows the same arm from the front. The picking arm 16 moves forwards to the shirts and then backwards to the pallet. At the rearmost position the arm comes into contact with base 24.

The picking arm has one or more adherence locations 26. Here three are shown by way of example, and the shirt is contacted at the adherence locations, to which the shirt adheres by one of several mechanisms as will be explained.

It is noted that the adherence location is smaller than the front of the shirt, in contrast with electrostatic based systems where the entire front of the shirt is contacted. Several adherence locations 26 may thus fit across the front of the waist, as necessary. The shirt is contacted by the adherence location at a contact location on the outer facing surface of the front of the garment and the contact location on the shirt adheres to the adherence location on the picking arm. The picking arm 16 is then able to pull the front of the shirt over the pallet, while at the same time the uncontacted back of the shirt slides under the front onto the back of the pallet.

In an embodiment the adherence location 26 is a chill point, which is kept below freezing. When contacting the garment, the chill point causes the liquid dispensed on the garment at the contact location to freeze and thus to adhere to the adherence location 26.

The picking arm 16 may ensure that liquid is present at the contact location. Tube 30 provides a liquid outlet for dispensing liquid onto the contact location prior to contact with the adherence location to provide the contact location with liquid for freezing by the chill point.

The liquid outlet may comprise a hollow needle dripper 32 for accurately dispensing or pouring the liquid onto the contact location.

In embodiments, the liquid is simply water, in which case the water may drip when needed by opening a valve. In other embodiments the liquid may have one or more added ingredients to increase viscosity and change the surface tension, for example the added ingredients may comprise small percentages of polyethylene glycol or ethylene glycol, which may form a gel. In this case a small pump may be needed since gels do not drip. Such changes in the properties of the liquid may ensure that there is adhesion of the liquid to the top layer and prevent the liquid from penetrating through the first layer.

Returning to FIG. 1, and a chiller 34 may be located on the side of the apparatus 10 for cooling the chill point or points 32.

As shown, the chiller 34 is mounted separately from the picking arm 16, so that the chiller does not necessarily move when the arm moves. The chiller 34 may be connected to the chill points via a flexible pipe that runs from the chiller through the flexible duct 22. The technical problem of a stationary chiller cooling mobile chill points is addressed by providing coolant in liquid form to travel down the pipe and allowing the fluid to evaporate in the vicinity of the chill points. Allowing the chiller to be stationary may reduce the load of the moving parts, thus allowing smaller, less heavy and/or cheaper designs.

The chill points may be kept below the freezing point of the liquid being used, thus below zero Celsius for pure water. To ensure more rapid freezing the chill points should be kept below minus six degrees Celsius, and it was found that a temperature at or below minus fifteen degrees Celsius may provide improved adhesion including making the adhesion more brittle so that it can be broken more easily afterwards. Temperatures at or below minus 20 degrees Celsius may also be advantageous.

As shown, three chill points are used to adhere the shirt at three locations, however more or fewer points may be used depending, for example, on the weight of the fabric, or the size or shape of the garment. Each chill point may be associated with a separate liquid outlet.

As shown in FIG. 2, a knife 36 may be located on the base opposite each attachment location for splitting the shirt from the attachment location when on the pallet, so that the pallet may move on with the shirt loaded thereon to the printing or sewing area as required, and the picking arm may prepare to pick the next shirt and load the shirt onto the next pallet. As a variation, a single continuous knife may extend opposite all the attachment points. The knife may allow for smooth detaching of the garment without leaving wrinkles that may adversely affect later processing, and without damaging the fabric.

Figure 6:
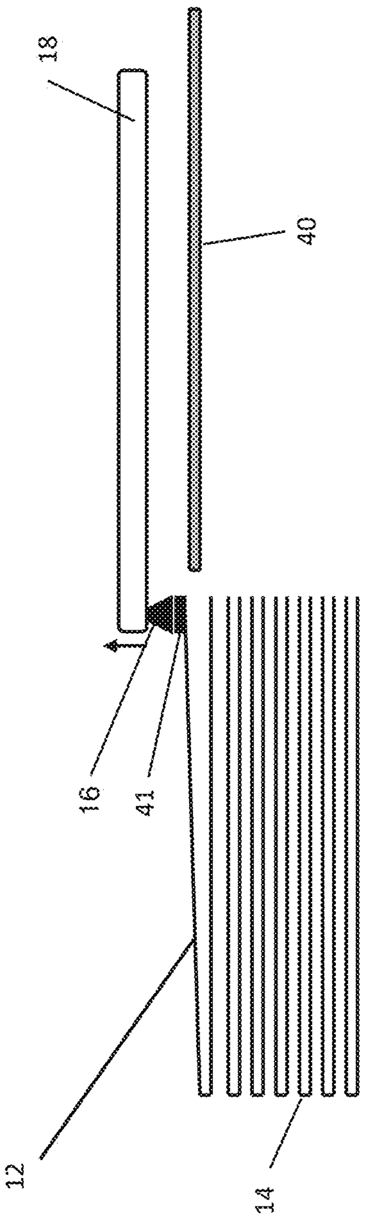
FIG. 6 is a simplified diagram showing the garment, the robot arm and the pallet according to embodiments of the present invention.

Reference is now made to FIG. 6 which is a simplified diagram showing a pile of garments 14 from which a single garment 12 is removed upwardly after adhesion to an adhesion point, the adhesion point including a sticker 41 of picking arm 16. Picking arm 16 moves along rail 18 to fit garment 12 over pallet 40.

In an alternative which is not claimed in this document, the shirt is provided with an adhesive sticker which is placed on the contact location. The sticker may be placed by the same picking arm or by other features within the apparatus or may be placed manually or otherwise in advance, so that the stack includes garments already carrying the sticker. The removable sticker may provide a substrate that is easier to handle than the textile itself, it has no fibers, is not porous, and is not absorbent, at least in comparison to the textile. The adhesive sticker may have adhesive on the back as well so that the adherence location simply sticks to the sticker and thus draws back the garment. Alternatively the adherence location may carry adhesive to attach to the sticker. A multiuse adhesive may be used so that the sticker may be reused. A mechanical pusher may release the sticker from the picker. The adhesion of the sticker to the garment may be higher than the adhesion of the picker to the sticker so that the sticker remains attached to the garment when removed from the picker.

In a further alternative, also not claimed herein, the adherence location comprises a suction point connected to a vacuum source and the picker sucks up the adhesive sticker at the adhesion location. Unlike the woven fabric, the adhesive sticker does not have holes so vacuum is more effective.

In a yet further alternative not claimed in this document, the adhesive sticker includes a ferrous metal and the adherence location includes a magnet or electromagnet for attaching to the adhesive sticker. The lifting and releasing process involving the sticker, and thus the upper layer of the garment, may be achieved simply using the magnets including electro-magnets. Ferromagnetic particles or a ferromagnetic layer may be incorporated into the sticker.

Thus, a sticker may thus provide an intermediary to lift only the first layer of the garment, that is the front of the shirt.

In embodiments, the sticker may be left on the garment and released only by the end user. Alternatively, the sticker may be removed using a mechanical remover similar to knife 36 which may be within the apparatus. Other options include a second arm to push the garment and detach the sticker, and a vacuum that sucks off the sticker while the garment is being mechanically held.

In embodiments, the sticker may contain a printed bar code and/or logo/images/size and/or an RFID, to allow the garment to be identified. In an embodiment, the picker arm may include an integrated printer for printing the logo/bar code or may include an RFID writer, and may include a device to place the sticker on the garment in the required position. The sticker may thus be used to identify the garment throughout the printing or sewing process, and is particularly useful for customized or one-off orders. Thus individually customized shirts may be printed or sewn according to orders provided in real time online.

It is noted that a sticker may be used for identifying the garment even if it is not used for adhering the garment. Thus a picker arm having chill points as described above may also include a printer or RFID writer.

In embodiments a single sticker may be used to provide a single adherence location. In such a case the garment may not be fully opened in the picking process for placing or loading onto the pallet and one or more mechanical openers may be needed to fully open the garment for sliding over the pallet.

As a variation on the sticker, an embodiment uses adhesive tape. A strip of adhesive tape is pressed onto the exposed fabric layer at the top of the stack and then the layer is moved by the picking arm as before.

In embodiments, the adhesive tape is used only once, and changed for each garment. In a variation, the same tape is used several times, until the gluing power is reduced by the fibers detaching from the fabric or the glue being removed.

The adhesive tape is selected so that the glue remains on the tape and does not stain the fabric.

Another embodiment involves using hot glue. Instead of chill points, heat points melt the glue for attachment. Afterwards, for release, the same heat points melt the glue again.

It is noted that the various embodiments described herein may be combined. Thus freezing may be used in combination with a sticker. Freezing may further be used in combination with an electrostatic plate, for example so that peeling away, a common problem with electrostatics, is prevented by a chill point and the electrostatic plate no longer has to be larger than the garment. Freezing using chill points may be combined with using wax. Freezing, or the sticker, or the adhesive tape, or the hot glue, may be combined with a mechanical spatula surface, so that the freezing etc., lifts up the layer from the stack and then the spatula is inserted under the raised layer.

Although the embodiments have been described with reference to garments and shirts in particular, they may apply to any textiles and to closed shapes of other materials that may need to be fitted around a pallet.

Although the embodiments are described with respect to garments having separate fronts and backs, the invention may be used in respect of garments or lengths of textile having just one side. In such a case the invention is useful in picking such garments or lengths of textile from a pile or stack without accidentally picking up the next item. In the case of the one-side garment the items are placed on the pallet. In the case of the two-sided garment the items are fitted onto the pallet from top and bottom. The term 'load' is used as a generic term to cover both placing the one-sided garment and fitting the two-sided garment.

For clarity, the various methods of adhering mentioned herein, including freezing, using a sticker with vacuum, magnetism or glue, or adhesive tape, or hot glue, are applicable with the one-sided case as well.

The various methods of adhering mentioned herein may be used to separate the top layer from the stack and then a mechanical insert may be inserted below the layer.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Temperature is herein recited in terms of a numerical range, and it is meant to include any cited numeral (fractional or integral) within the indicated range.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus for picking a garment having a first layer and a second layer and fitting the garment on a pallet having a front and a back such that the first layer and the second layer of the garment are on the front and the back sides respectively of the pallet, the apparatus comprising:

a pallet, the pallet having said front and said back and wherein the first layer and the second layer of the garment are on the front and the back sides respectively of the pallet when the garment is fitted onto the pallet;

a picking arm, the picking arm being a robot arm configured to approach the garment when the garment is on a stack prior to fitting on the pallet, the picking arm being configured to subsequently withdraw towards the pallet;

at least one adherence location on said picking arm, the adherence location being smaller than the first layer, the adherence location for contacting the garment at a contact location on an outer facing surface of the first layer of the garment and causing adherence of the garment, at the contact location, to the adherence location, thereby causing said picking arm to pull said garment, through said first layer, over said pallet, wherein said uncontacted second layer slides under said first layer onto said back side of said pallet, wherein said adherence location is configured with adhesive to apply said adhesive to said garment.

2. Apparatus according to claim 1, further comprising a knife for splitting said garment from said attachment location at said pallet.

3. Apparatus according to claim 1, comprising at least two attachment locations.

4. Apparatus according to claim 1, comprising three attachment points.

5. Apparatus according to claim 1, wherein the garment is a top garment in a stack of garments.

6. Apparatus for picking a garment having a first layer and a second layer and fitting the garment on a pallet having a front and a back such that the first layer and the second layer of the garment are on the front and the back sides respectively of the pallet, the apparatus comprising:

a pallet, the pallet having said front and said back and wherein the first layer and the second layer of the garment are on the front and the back sides respectively of the pallet when the garment is fitted onto the pallet;

a picking arm, the picking arm being a robot arm configured to approach the garment when the garment is on a stack prior to fitting on the pallet, the picking arm being configured to subsequently withdraw towards the pallet;

at least one adherence location on said picking arm, the adherence location being smaller than the first layer, the adherence location for contacting the garment at a contact location on an outer facing surface of the first layer of the garment and causing adherence of the garment, at the contact location, to the adherence location, thereby causing said picking arm to pull said garment, through said first layer, over said pallet, wherein said uncontacted second layer slides under said first layer onto said back side of said pallet, wherein said adherence location comprises a sticker with adhesive to apply said sticker to said garment.

7. Apparatus for picking a garment having a first layer and a second layer and fitting the garment on the apparatus comprising:

the pallet, the pallet having a front and a back such that the first layer and the second layer of the garment are on the front and the back layers respectively of the pallet;

a picking arm, the picking arm being a robot arm configured to approach the garment and then withdraw towards the pallet;

at least one adherence location on said picking arm, the adherence location for contacting the garment at a contact location on an outer facing surface of the first layer of the garment and causing adherence of the garment, at the contact location, to the adherence location, thereby causing said picking arm to pull said first layer over said pallet, wherein said uncontacted second layer slides under said first layer onto said back layer of said pallet, the adherence location comprising a contact point with adhesive to apply a layer of adhesive at said contact location, to attach said contact location.

8. The apparatus of claim 7, wherein said adhesive comprises a coating on one side of a sticker, the sticker placed for bringing into contact with the garment at the contact location.

* * * * *